Nov. 15, 1938.  W. R. TUTTLE  2,137,149
ELECTRIC HEATING UNIT
Filed Jan. 16, 1937  2 Sheets-Sheet 2
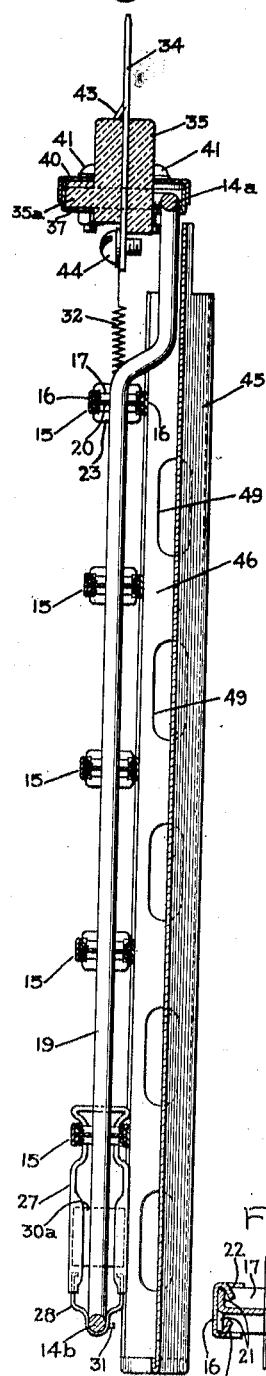
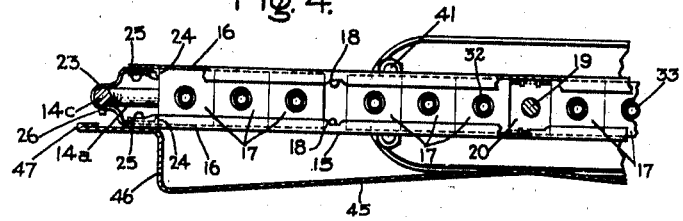
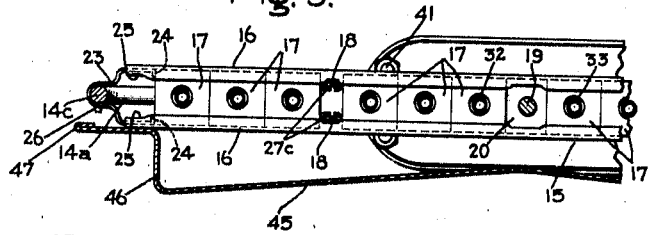
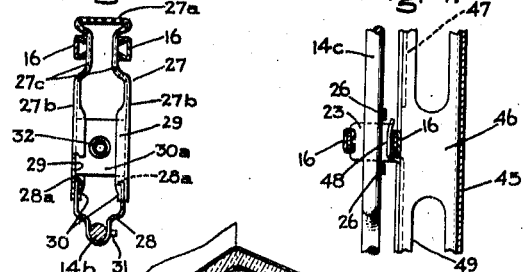
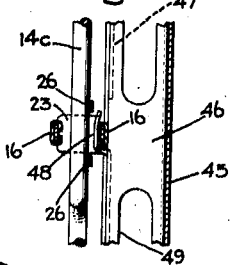
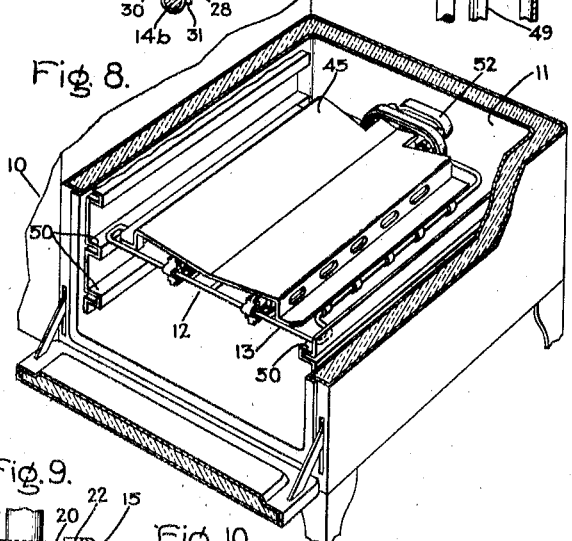
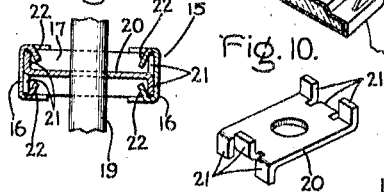
Inventor:
Will R. Tuttle,
by Harry E. Dunham
His Attorney.

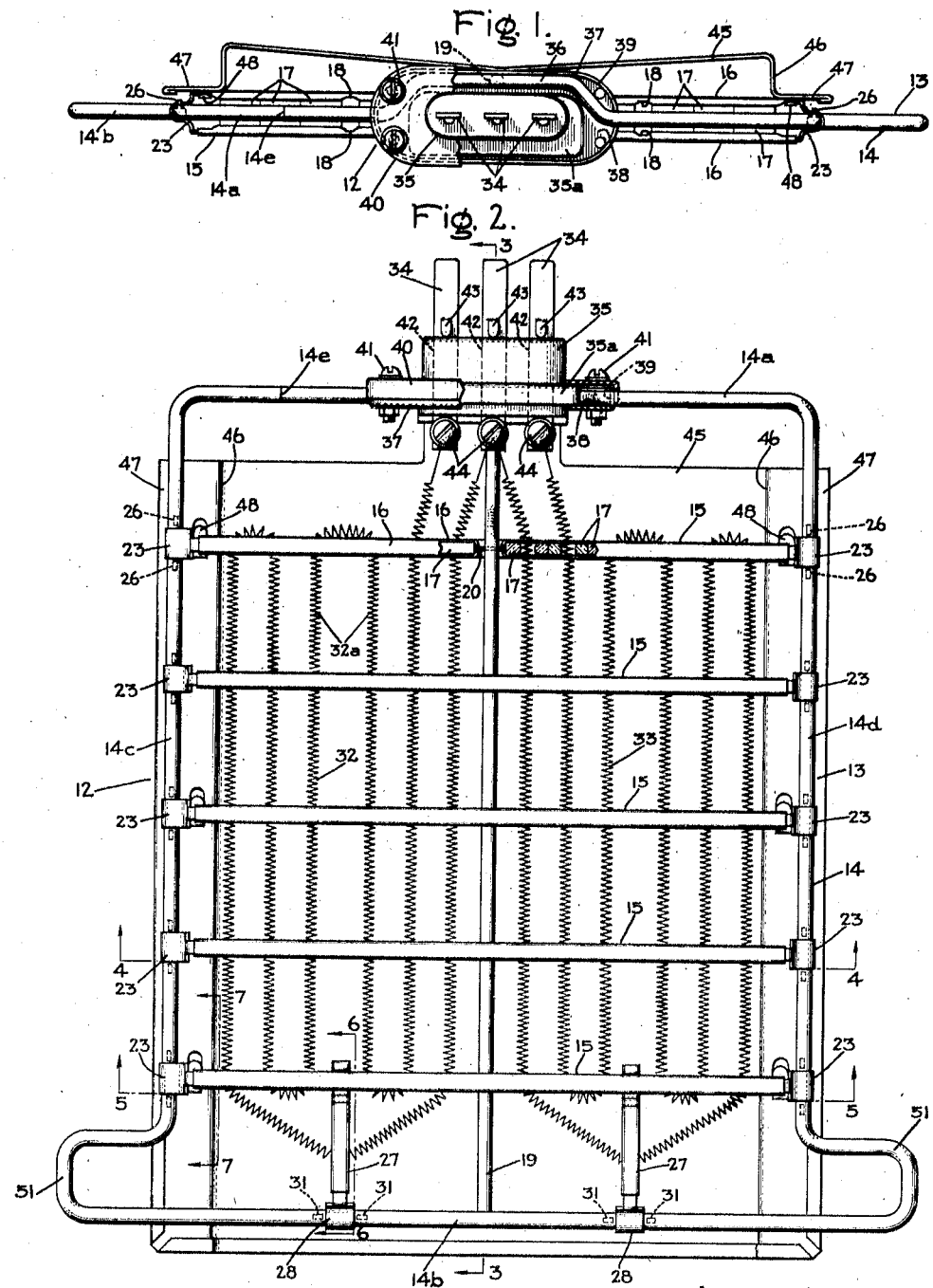

Patented Nov. 15, 1938

2,137,149

UNITED STATES PATENT OFFICE 2,137,149

ELECTRIC HEATING UNIT

Will R. Tuttle, Riverside, Ill., assignor to Edison General Electric Appliance Company, Chicago, Ill., a corporation of New York Application January 16, 1937, Serial No. 120,945

13 Claims. (Cl. 219—19)

This invention relates to electric heating units, and it has for its object the provision of an improved device of this character.

While not limited thereto, this invention has particular application to electric heating units for the ovens of electric ranges.

This invention contemplates the provision of an improved electrical heating unit having a rigid and strong, but relatively light construction, and one which can be simply and economically made.

For a more complete understanding of this invention, reference should be had to the accompanying drawings, in which Fig. 1 is an end elevation of an electric heating unit embodying this invention, parts being broken away so as to illustrate certain details of construction; Fig. 2 is a plan view of the electric heating unit of Fig. 1, parts being broken away and parts shown in section so as to illustrate certain details of construction; Figs. 3, 4, 5, 6 and 7 are sectional views taken through the lines 3—3, 4—4, 5—5, 6—6 and 7—7 respectively, of Fig. 2 and looking in the direction of the respective arrows; Fig. 8 is a perspective view of an electric range oven showing the electric heating unit of Figs. 1 to 7 in operative position in the oven; Fig. 9 is an enlarged fragmentary sectional view taken through the line 3—3 of Fig. 2, and Fig. 10 is a perspective view of a part of the structure shown in Fig. 9.

Referring to the drawings, this invention has been shown as applied to an electric heating unit intended to be used in the oven of an electric range, although it is to be understood that this invention is applicable to electric heating units for general use in electrically heated devices. As shown in Fig. 8, the electric range 10 comprises an oven compartment 11. Mounted in the oven compartment is an electric heating unit 12 arranged in accordance with this invention.

As shown more particularly in Figs. 1 to 7, and 9 and 10, the electric heating unit 12 comprises a frame 13. The frame 13 is formed of a heavy wire 14 closed upon itself and arranged so as to give the desired shape to the heating unit. As shown more clearly in Fig. 2, the wire member 14 is closed so as to define a rectangular frame having end portions 14a and 14b joined by sides 14c and 14d. The two ends of the wire member are secured together in any suitable manner as by a welded joint 14e. Preferably, the wire member 14 will be formed of heavy steel wire.

Mounted on the frame 13 are a plurality of resistance conductor supporting members 15. These members, as shown, are arranged transversely of the frame between the side portions 14c and 14d and spaced at intervals longitudinally of the frame. Preferably, the members 15 will be arranged in parallel relation to each other.

Each supporting member 15 is formed of a pair of channels 16, shown more clearly in Figs. 1, 3, 4 and 5. Each pair of channels 16 faces each other and mounted within the channels are a plurality of insulating members 17 formed of any suitable material, such as porcelain. As shown more clearly in Figs. 1, 4 and 5, the insulators 17 are arranged in groups or series spaced apart crosswise of the channel. In the specific heater shown, there are three insulators 17 in each of these groups. In order to hold the insulators in their spaced-apart relation, the sides of the channels opposite the spaces between the groups of insulators are bent or peened inwardly to define sections 18 (Figs. 1 and 4) lying in the spaces and engaging the insulators on opposite sides of the spaces to prevent their moving into the spaces.

A reinforcing or supporting member 19, preferably of rod or wire-like form, is directed between the end members 14a and 14b of the frame, as shown clearly in Fig. 2, and has its end portions secured to these end members of the frame in any suitable manner, as by welding. The rod 19 is directed between each pair of channels, as shown more clearly in Figs. 3, 4, 5 and 9. Mounted on each pair of channels where the rod 19 passes through them is a metallic plate 20, see Figs. 3, 4, 5, 9 and 10. The plates 20 are provided with tabs 21 on their edges that are received in the channels 16. The channels are provided with crimped-over or bent portions 22 tightly engaging the tabs so as to rigidly secure the plates to the channels. Each of the plates 20, as shown, has a centrally arranged aperture through which the rod 19 is directed. The rod 19, therefore, functions to reenforce and strengthen the central portions of the heating unit. Preferably, the rod will be formed of heavy steel wire.

The supporting members 15 at their outer ends are secured to the side portions 14c and 14d of the frame 13 by means of metallic clips 23. The metallic clips 23 have in general a U-shape, the nexus of the U-shaped clips being relatively small and fitting tightly over the side members of the frame, as clearly shown in Figs. 4 and 5. The legs of the clips spread outwardly from the nexus, as shown in these figures, and are received in the two channels 16 of the supporting members. The inner ends of these legs are provided with inturned ends 24. As shown more clearly in Figs. 4 and 5, the end portions of the channels are crimped over or bent inwardly, as indicated by the numeral 25, so as to fit tightly about these inturned portions and the end portions of the legs. The clips 23 are secured against longitudinal movement on the side members 14c and 14d by ears or lugs 26, positioned on opposite sides of the clips, as clearly shown in Fig. 2. These ears or lugs 26 preferably will be formed of the stock of the metal of the wire 14. They may be made in any suitable die or pressing machine.

The supporting member 15 is at one end of the frame 13,—the end supporting member adjacent the lower end of the frame, as viewed in Fig. 2,—is rigidly connected with the adjacent end bar 14b of the frame by metallic members 27 and clips 28. A pair of these members 27, 28 are used. The members 27, as shown more clearly in Fig. 6, have in general a U-shaped form, and are directed between the channels 16 through the spaces between the series of insulators 17. The nexus 27a of each member 27 is on one side of channels, while the major portions of its legs 27b are on the opposite side. The legs 27b are provided with depressions or reduced parts 27c receiving the channels so as to interlock the members 27 with the channels. The end portions of the legs 27b, as shown, have channel sections 29. Received in these channels are the legs of the clip members 28. These clip members are similar to the clip members 23, and closely embrace the end wire 14b of the frame 14. These members 28 also have inturned ends 28a and over these end portions the sides of the channels 29 are crimped or peened, as indicated by the numeral 30. The clips 28 are prevented against lateral movement on the end bar 14b by means of ears 31 formed in bar.

Mounted in each pair of channels 29 is an insulator 30a similar to the insulators 17.

Mounted in the end portion 14a of the frame 13 opposite the connection members 27, 28 are three suitable electric supply terminals 34.

The insulating members 17 and 30a, as shown, are provided with centrally arranged apertures. Through these centrally arranged apertures are wound suitable resistance conductors 32 and 33. As shown, the resistance conductor 32 is distributed on one side half area of the heating unit, whereas the other resistance conductor 33 is distributed over the other half. The resistance conductor 32 may be traced from the left hand-terminal pin 34, as viewed in Fig. 2, through the supporting members 15 to define a plurality of convolutions 32a, and thence through the insulator 29 in the support 27 on the left-hand side of the heating unit and thence returning to the middle terminal 34 through the supports 15. The other heating element 33 is directed from the right-hand terminal 34 and is threaded in a similar manner through the supporting insulators, returning to the middle terminal 34. It will be understood that the heating elements 32 and 33 may be connected to the supply source in series or in parallel to provide low and high heats, or one alone may be connected to the supply source so as to provide a medium heat.

The terminal pins 34 are mounted in a suitable terminal block 35 which is formed of any suitable electrically insulating material, such as porcelain. This member has flange 35a extending outwardly therefrom between the ends of the insulator. The end portion 14a of the frame is provided with a part 36 formed upwardly from the plane of the frame, as viewed in Fig. 1, so as to provide space for the flange 35a. Rigidly secured to the end portion 14a on its side facing the heating unit proper is a casing member 37 having a bottom wall 38 against which the insulator flange rests, and a peripheral wall 39 extending outwardly from the bottom wall around the flange, as clearly shown in Fig. 2. The member 37 is secured to the frame in any suitable manner, as by welding. Cooperating with this casing member is a lid or oppositely positioned casing member 40 having a similar form, and secured to the member 37 in any suitable manner, as by means of screw fastening means 41. The insulator flange is thus clamped in the casing members. The casing members 37 and 40 are provided with apertures through which the end portions of the insulator extend from the flange 35a, as clearly shown in Figs. 1 and 2.

The insulator 35 is provided with three laterally spaced channels 42 through which the terminals 34 are slid. The terminals are secured against inward movement relative to the insulator by means of tongues or tabs 43 formed upwardly from the stock of the terminals, and are prevented from being withdrawn from the insulator by means of binding screws 44 which are used to secure the ends of the resistance conductors 32 and 33 to the terminals.

Arranged on one side of the frame 13, the upper side of the frame, as viewed in Fig. 1, is a reflecting pan or plate 45. This plate or pan, as shown, is provided with walls 46 at the sides arranged generally at right angles to the bottom of the plate. These walls terminate in outwardly extending flanges 47. These flanges 47 are secured to the clips 23 by means of suitable tongues of metal 48 formed outwardly from the stock of the flanges. These tongues are directed through the clips and crimped down over them, as clearly shown in Figs. 1, 2 and 7. The bottom wall of the reflector tapers inwardly from the sides to the center, as shown in Fig. 1, so as to strengthen the reflector to prevent warpage, and so as to direct the flow of heated air out to the sides of the reflector. The side walls are provided with spaced apertures 49 through which the heated air passes to the upper part of the oven compartment.

In Fig. 8, the heating unit 12 is shown in operating position in the oven 11. As shown, the oven is provided with a plurality of supports 50 positioned opposite each other in the oven. The forward part of the heating element is supported by these members. For this purpose, the wire member 14 at the forward end of the unit is provided with outwardly extending portions 51 forming supporting ears which rest upon the members 50. At the rear, the heating element is supported by means of the terminal pins 34 which are received in a suitable electrical supply socket 52, provided in the rear wall of the oven.

It will be understood that the heating element may be supported in its position shown in Fig. 8, wherein the heat is directed downwardly by the reflector 45 for the purpose of effecting suitable broiling operations, or that the element may be reversed so that the reflector is under the element to direct the heat upwardly for baking and like operations.

It will be observed that I have provided an electric heating unit having relatively simple parts which are of light construction. The parts are inexpensive and may be assembled in any suitable machine, or by hand.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electric heating unit comprising a frame having outer oppositely positioned supporting portions, resistance conductor supporting members between said portions having channel sections at the ends, clips embracing said supporting portions, and said channel sections being crimped over the legs of said clips so as to secure said clips to said supporting portions.

2. An electric heating unit comprising a frame having outer oppositely positioned supporting portions, resistance conductor supporting members between said portions having channel sections at the ends, U-shaped clips embracing said supporting portions having inturned portions at the ends of their legs, the legs received in said channel sections, and said channel sections folded over to engage said legs and the inturned portions of the legs engaging the folded parts of said channels to prevent withdrawal of said clips.

3. An electric heating unit comprising a wire frame having oppositely positioned legs at the sides, channels arranged in pairs facing each other and extending crosswise between said legs, insulating blocks in said channels, a resistance conductor supported by said blocks, U-shaped clips at the ends of said channels embracing said wire legs and having their legs received in said channels, and the sides of said channels being crimped over to engage said legs.

4. An electric heating unit comprising a wire frame having oppositely positioned side portions, channels arranged in pairs facing each other and extending crosswise between said side portions, insulating blocks in said channels, a resistance conductor supported by said blocks, U-shaped clips at the ends of said channels embracing said side portions and having inturned portions at the ends of their legs, said legs received in said channels and the channels folded over the portions of said legs and inturned portions to interlock said clips with said channels.

5. An electric heating unit comprising a closed wire member forming a supporting framework having oppositely positioned supporting sections, pairs of oppositely positioned channels between said supporting sections spaced at intervals along their length, insulating supports in said channels, a resistance conductor threaded through said supports, U-shaped clips fitted closely over said supporting sections having legs in said channels, said channels being folded over to engage said legs and the legs having inturned portions engaging the folded parts of said channels to prevent withdrawal of said clips.

6. An electric heating unit comprising a frame having outer oppositely positioned wire-like supporting portions, resistance conductor supporting members between said portions, clips embracing said wire-like portions having legs received in interlocking relation with said supporting members, and parts of said wire-like portions formed outwardly therefrom on opposite sides of said clips to define ears positioned to prevent substantial endwise movement of said clips on said wire-like portions.

7. An electric heater comprising a frame having oppositely positioned wire members, a pair of channels facing each other extending between said wire members, series of insulating members mounted in said channels at spaced intervals crosswise thereof, the portions of said channels between said series being pressed inwardly to space the series one from the other, clips fitted over the ends of said wire members having legs received in said channels and engaging the series of insulating members at the ends of said channels to space them from said wire members, and means securing said legs to said channels.

8. An electric heating unit comprising a frame having side and end portions, resistance conductor supporting channels extending between said side portions, means securing the ends of said supporting channels to the side portions, a member between said side portions extending between the end portions, means securing said member to said end portions, and plates on said member interlocked with said supporting channels by sections of the channels crimped on the plates.

9. An electric heating unit comprising a frame having sides and end portions connected together, pairs of channels arranged crosswise of said frame spaced at intervals along the length thereof, the channels of each pair facing each other, means securing the ends of said channels to said side portions, insulating members supported by said channels, a resistance conductor on said insulating members, a rod extending from one of said end portions to the other between the channels of each pair, a plurality of plates on said rod received between said pairs of channels, the portions of the sides of said channels opposite said plates being folded inwardly toward the plates, and tabs on said plates received under said folded portions whereby said channels are secured to said plates.

10. A heating unit comprising a frame having side portions opposite each other and a portion connecting said side portions, a pair of spaced apart members extending between said side portions in spaced relation with said end portion, a substantially U-shaped member having an interlocking connection with said spaced members adjacent its nexus, and its legs extending toward said end portion, a substantially U-shaped clip embracing said end portion and having its legs extending toward said spaced members, interlocking connections between the legs of said U-shaped member and said clip, insulators supported by said spaced members and said U-shaped member, and a resistance conductor supported on said insulators.

11. A heating unit comprising a wire frame having side portions opposite each other and an end portion connecting said side portions, a pair of channels extending between said side portions spaced from said end portion, the channels facing each other and spaced apart, clips embracing said side portions interlocked with said channels, spaced insulators in said channels, a substantially U-shaped member extending through said channels in the space between said insulators having near its nexus reduced portions in its legs received by reduced portions in the legs of said channels to effect an interlocking connection between said members, the legs of said U members extending toward said end portion and provided with channel sections, an insulator in said channel sections, a clip embracing said end portion having its legs received in said channel sections, the ends of the legs being inturned, and the sides of said channel sections folded over said inturned ends to lock said clip to said U-member, and a resistance conductor threaded through said insulators.

12. An electric heating unit comprising a closed wire constituting a frame having a portion formed outwardly from the plane of the frame, a resistance conductor supported by said frame, terminals for said resistance conductor, an insulating block supporting said terminals having a flange extending outwardly therefrom and received in said outwardly formed portion of said frame, and a casing rigidly secured to said outwardly formed portion housing said flange so as to secure said insulating block to said frame.

13. An electric heating unit comprising a wire-like frame, a plurality of U-shaped clips spaced at intervals along the sides of said frame and embracing said sides, resistance conductor supporting means supported by the legs of said U-shaped clips, a reflector plate separable from said frame and positioned at one side thereof, and said plate having a plurality of tongues at each side directed between the legs of certain of said clips and crimped over one of said legs so as to hold the reflector plate to the frame.

WILL R. TUTTLE.